US009076277B2

(12) United States Patent
Delong

(10) Patent No.: US 9,076,277 B2
(45) Date of Patent: Jul. 7, 2015

(54) VEHICLE GLASS DAMAGE DETECTION AND REPORTING METHOD

(71) Applicant: Ronald Verne Delong, Gilbert, AZ (US)

(72) Inventor: Ronald Verne Delong, Gilbert, AZ (US)

( * ) Notice: Subject to any disclaimer, the term of this patent is extended or adjusted under 35 U.S.C. 154(b) by 0 days.

(21) Appl. No.: 14/218,753

(22) Filed: Mar. 18, 2014

(65) Prior Publication Data

US 2014/0285332 A1 Sep. 25, 2014

Related U.S. Application Data

(60) Provisional application No. 61/803,259, filed on Mar. 19, 2013.

(51) Int. Cl.
*B60Q 1/00* (2006.01)
*G07C 5/08* (2006.01)
*G07C 5/00* (2006.01)

(52) U.S. Cl.
CPC ................ *G07C 5/085* (2013.01); *G07C 5/008* (2013.01)

(58) Field of Classification Search
CPC ............................ G06Q 30/0611; G06T 7/002
USPC .......... 340/436, 438, 517, 601, 580; 705/26.4
See application file for complete search history.

(56) References Cited

U.S. PATENT DOCUMENTS 7,663,491 B2 * 2/2010 Hwang et al. .............. 340/572.7
2014/0201022 A1 * 7/2014 Balzer ........................... 705/26.4

* cited by examiner

*Primary Examiner* — Toan N Pham

(57) ABSTRACT

A method to detect objects striking the windshield or other glass in a vehicle and report this at the conclusion of a vehicle rental transaction. A microphone or other device capable of detecting the sound of objects striking the windshield or glass of a vehicle is used to convert the sound into an electrical signal which is further processed and results of a suspected glass strikes are stored. This stored result is communicated to the rental agency following the completion of the rental period so that a thorough inspection for damage can be made and such damage can be assigned to the responsible party.

10 Claims, 1 Drawing Sheet

SIMPLIFIED BLOCK DIAGRAM of a VEHICLE GLASS DAMAGE DETECTION AND REPORTING METHOD

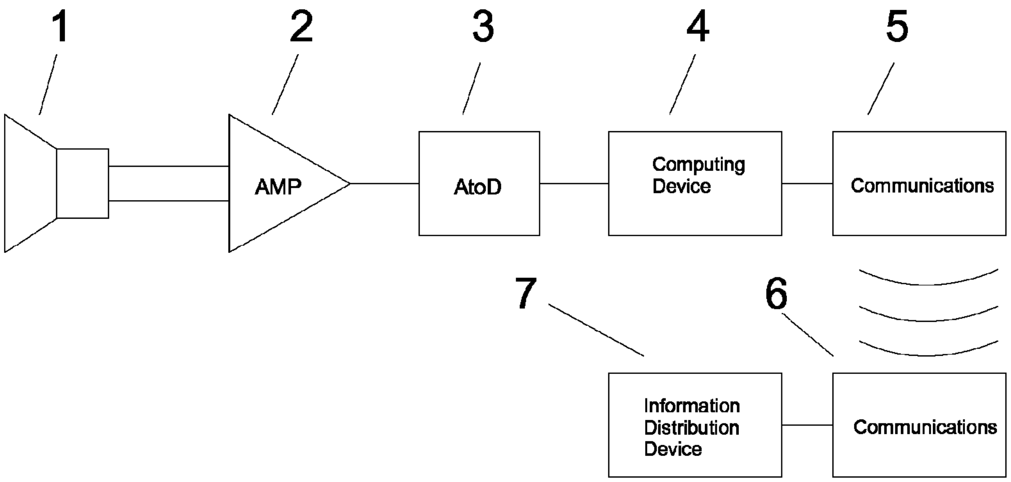
SIMPLIFIED BLOCK DIAGRAM of a VEHICLE GLASS DAMAGE DETECTION AND REPORTING METHOD

VEHICLE GLASS DAMAGE DETECTION AND REPORTING METHOD

FIELD OF THE INVENTION

This invention relates to a method of detecting and determining possible damage to a rented vehicle and subsequently reporting such damage at the end of the rental period. In particular, this invention detects and reports damage caused by an object or objects striking the windshield or windows of the vehicle.

BACKGROUND OF THE INVENTION

In the current state of the art, a visual inspection must be made of a vehicle being returned from a rental activity for damage that may have occurred during the rental period. This is necessary so that any possible recovery for the damage from the renter can be acted upon. Further, this prevents the wrong party, a subsequent renter, from being incorrectly assigned responsibility for the damage.

The problem is that a visual inspection requires time and effort to be expended by the rental agency personnel and the visual inspection may not detect a small crack in the glass that may later grow into a much larger crack necessitating glass replacement, possibly at the rental agencies expense. There is also a problem of detecting hail damage to the vehicle that may not be immediately apparent.

By detecting and alerting the rental agency personnel to possible glass or hail damage, a more detailed inspection can be made, reducing the chance of undetected damage. Further, if possible glass or hail damage is not detected during the rental period, inspection of the vehicle may not be necessary and the rental transaction may be expedited, reducing cost to the rental agency and increasing customer satisfaction.

BRIEF SUMMARY OF THE INVENTION

An object, or objects, striking the glass of a vehicle with enough force to cause damage creates a high level short pulse of sound which is different in a combination of amplitude and wave shape than other sounds that are routinely produced in a vehicle. By using an audio detection device and further, determining if any sound picked up by it matches a combination of amplitude and a particular wave shape indicative of a damaging glass strike, such incidents can be detected and stored in a computer memory. When the vehicle is returned to the rental agency, this information can be communicated to personnel who would subsequently visually inspect the vehicle for this type of damage.

BRIEF DESCRIPTION OF THE DRAWINGS

FIG. 1 shows a simplified block diagram of the Invention.

DETAILED DESCRIPTION OF THE INVENTION

In accordance with the present invention, and in a preferred embodiment, a device that converts sound pressure to electrical energy 1 would be mounted in the passenger compartment of the vehicle where it would be impacted by the sound waves of an object striking the windshield or windows.

There are typically two kinds of glass in a motor vehicle. Laminated glass is used in the windshield so that it does not tend to shatter, but instead will fracture. An inner layer of elastic material holds the glass together to prevent the it from being blown into the passenger compartment by the force of the wind on a moving vehicle. Tempered glass is used on the side and back windows of the vehicle where the force of the wind does not tend to direct the broken glass on to the passengers. Often a tempered glass window is completely shattered and if not shattered, a hole is formed completely through the glass. For this reason, damage to the tempered glass is much more easily detected visually than damage to the laminated glass. Damage to laminated glass often starts as a small crack when initially struck which may be very difficult to detect, but may grow into a large crack over time. For this reason, the preferred embodiment places the sound detector on the dashboard of the vehicle in the area underneath the laminated glass windshield. Other placements in the vehicle are possible depending on mounting restrictions or special areas of interest. For instance, it is possible to place the sound detector directly on the windshield and windows of the vehicle.

The sound detection device 1 is connected to an electrical amplifier 2 in a way that electrical currents from the sound detection device caused by sound waves impacting it are amplified. An analog-to-digital converter 3 converts the voltage level from the amplifier to a numerical value. A number of numerical values are obtained which represent the waveform of the sound wave striking 1. These values are operated on by a computing device 4 which has the capability of analyzing the waveform. Analysis consists of comparing the detected waveform to criterion which would indicate possible glass damage. The criterion is comprised of such things as amplitude, ringing frequency and decay rate. Further, the computing device 4 has the capability of storing the information that such possible damage had been detected and any other data relevant to the incident. The computing device 4 is able to pass this information through a communications link comprised of 5, 6 and 7 to rental agency personnel at the end of the rental period. The communications of this information to the rental agency personnel would be facilitated by the information distribution device 7. This information distribution device may consist of a computer at the rental agency with a program allowing communications either directly from the computer or through transmission of the information to devices used or possessed by the rental agency personnel. Following successful transmission of the information to the rental agency personnel, the impact detection would be reset to indicate no damage detected in anticipation of, or at the start of a new rental period.

One embodiment uses a loudspeaker which can also serve to communicate with the renter. For instance, it may inform the renter that they may by-pass the rental return counter and go directly to a shuttle for return to an airport, or request that they go to the rental return counter before going to a shuttle. It also serves the main purpose of this invention by converting sound pressure to electrical energy, a common characteristic of a conventional loudspeaker. A more conventional microphone could also be used, but would not likely serve this dual purpose.

The communication provided by 5, 6 and 7 may contain additional information such as vehicle mileage, fuel tank level and other collision detection data which would further assist the rental vehicle agency in expediting the rental transaction by reducing the number of physical inspections that need to be performed on returning vehicles. The methods of gathering and communicating this added information has been to the subject of prior art and is well known to one versed in the art and is not discussed here.

I claim:

1. A method to detect, store and report to a vehicle owner or their agent damage events caused by an object or objects striking a windshield of a vehicle comprising:

an acoustic transducer which converts an acoustic waveform into an electrical waveform;

a converter to convert the electrical waveform to a digital signal for analysis by a computing device;

the computing device capable of analyzing the waveform and determining if a damage event have occurred;

a storage for storing the detection of the damage events; and a communication to signal the damage events information to the owner or agents of the owner; wherein the damage event analysis indicates multiple objects striking the windshield with sufficient force and frequency to indicate hail damage to the windshield, the vehicle or to both.

2. The device of claim 1 with the acoustic transducer located in proximity to the windshield of the vehicle.

3. The device of claim 1 wherein the damage event analysis indicates an object that struck the windshield with sufficient force to indicate damage to the windshield.

4. The device of claim 3 comprising a cell communications data link.

5. The device of claim 3 comprising a satellite communications data link.

6. The device of claim 1 where the signaling is performed using electromagnetic radiation.

7. The device of claim 6 comprising a wireless network based on IEEE 802.11.

8. The device of claim 6 comprising a cell communications data link.

9. The device of claim 6 comprising a satellite communications data link.

10. The device of claim 6 comprising a light generating device.

* * * * *